UNITED STATES PATENT OFFICE.

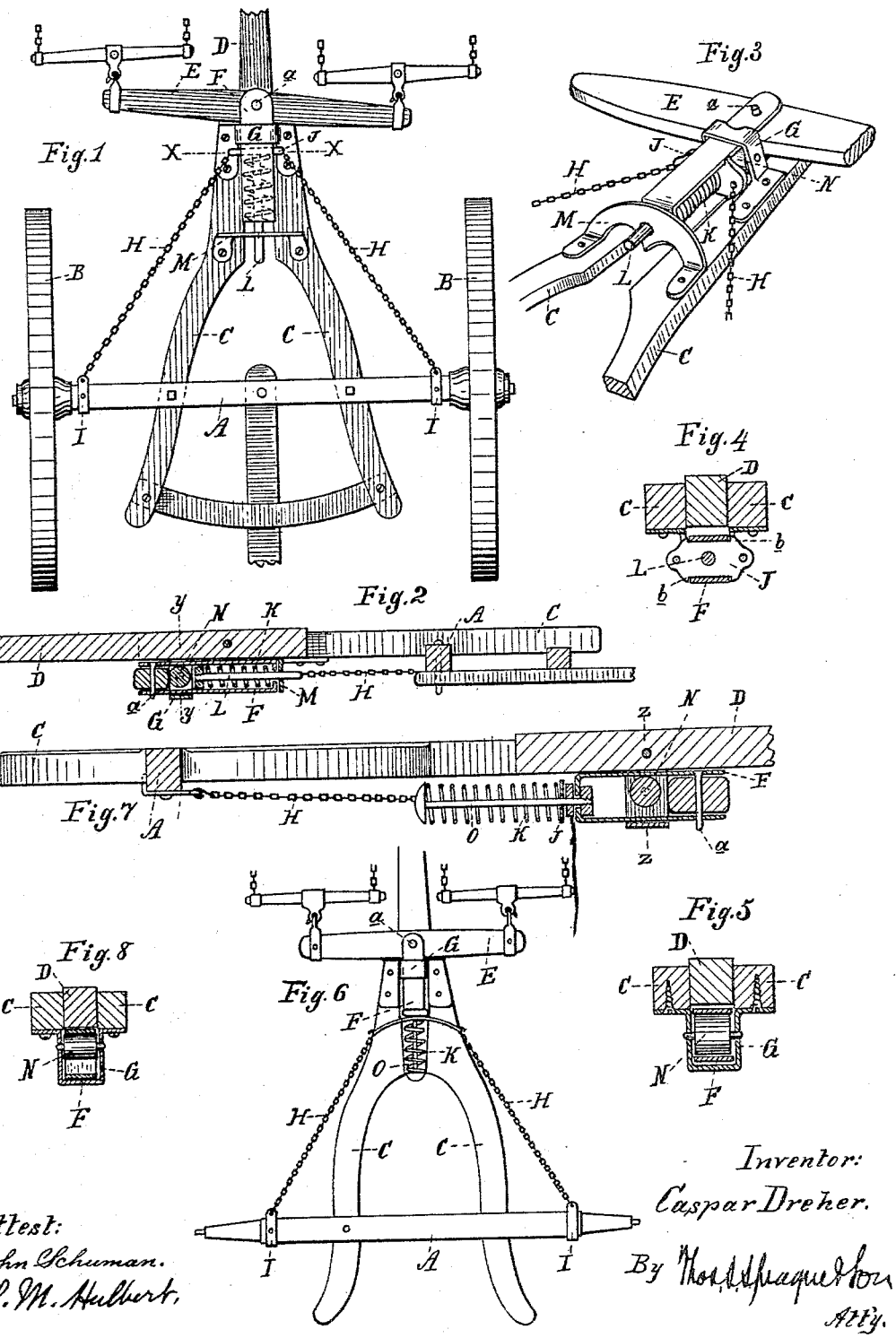

CASPAR DREHER, OF DETROIT, MICHIGAN.

DRAFT APPARATUS FOR VEHICLES.

SPECIFICATION forming part of Letters Patent No. 388,847, dated September 4, 1888.

Application filed May 21, 1888. Serial No. 274,547. (No model.)

*To all whom it may concern:*

Be it known that I, CASPAR DREHER, a citizen of the United States, residing at Detroit, in the county of Wayne and State of Michigan, have invented certain new and useful Improvements in Draft Apparatus for Vehicles, of which the following is a specification, reference being had therein to the accompanying drawings.

This invention relates to new and useful improvements in draft attachments for wagons; and the invention is especially designed for such wagons intended for drawing heavy loads and to which two or more horses are attached.

The invention belongs to that class of devices wherein the power of the horses is applied through the medium of a spring or springs included in the draft apparatus for the purpose of preventing sudden strains to be brought upon the horses' necks when starting a wagon or when drawing a load on uneven ground.

The invention consists in the peculiar construction and arrangement of the parts, whereby the device is adapted to prevent one horse from bringing a sudden strain upon the other horse's neck when the two horses do not start the load together, and whereby the device is further adapted to transmit the power in the most favorable manner upon the outer ends of the front axle, and whereby the device is manufactured cheaply and can be readily attached to the ordinary styles of wagons, all as more fully hereinafter described.

In the accompanying drawings, Figure 1 is a bottom plan of my device applied to a wagon. Fig. 2 is a central longitudinal section thereof. Fig. 3 is a bottom perspective of a part of the draft device. Fig. 4 is a cross-section on line *x x* in Fig. 1. Fig. 5 is a similar section on line *y y* in Fig. 2. Fig. 6 is a bottom plan showing my invention applied in another form more adapted for lighter wagons. Fig. 7 is a central longitudinal section of Fig. 6. Fig. 8 is a cross-section on line *z z* in Fig. 7.

A is the axle. B are the two front wheels of a wagon, and C are the curved hounds, between the forward ends of which is secured, in the usual manner, the draft-pole D, these parts being of known construction.

E is the doubletree, centrally and pivotally secured, by means of the pivot-bolt *a*, between the forward ends of the U shaped or forked tree iron F, which is slidingly and centrally secured to the under side of the front ends of the hounds by means of a stirrup, G, mounted upon the under side of the forward end of the hounds.

H represents two draft-chains secured at their rear ends, by means of clips I, to the under side of the axle, near the wheels, and at their front ends connected to the outer ends of the cross head.

K is a coil spring or springs interposed between such cross-head and the rear end of the tree-iron.

In Figs. 1, 2, 3, and 4 the cross head J passes between the fork of the tree-iron, and is held in a sliding engagement therewith by means of shoulders *b*, formed in the cross-head, and the rear end of the tree-iron is guided upon the guide-rod L, which is secured at its forward end to the cross-head J, and at its rear end passes loosely through an aperture in the rear end of the tree-iron, and is slidingly supported in a suitable bearing, M, upon the under side of the hounds. This guide rod also passes through the coil spring or springs to prevent them from displacement. The forward end of the tree-iron may be guided by means of a friction roll or rolls, N, journaled in the stirrup F.

In the modification shown in Figs. 6, 7, and 8 the tree-iron is provided with the extension or shank O, longitudinally adjustably secured thereto, and upon this shank the spring or springs K are supported, and the cross-head J slidingly engages upon said shank.

In practice, the parts being constructed and arranged as described, they are intended to operate as follows: When the horses are not pulling, the tension of the spring holds the rear side of the doubletree firmly against the stirrup F. Thus, if either one of the horses starts in advance of the other, the doubletree has a fulcrum against the stirrup, and the horse thus draws upon the load through the medium of the coil-spring, instead of bringing a sudden strain upon the horse, as would be the case otherwise. Further, after both horses have started to pull, the doubletree is perfectly free of the stirrup, and the power of the horse is applied through the medium of the spring or springs. Thus, if the load is drawn upon uneven ground, no sudden jerks or strains can be brought upon the horse's neck. It will further be seen that by applying the whole draft apparatus to the under side of the hounds a more direct line of draft is obtained, and as the draft increases the coil-spring compresses and gains great resistance in pulling the load.

The tension of the spring may be readily adjusted in either construction shown. This is done either by shortening or lengthening the chains or by shortening or lengthening the shank O shown in the modification.

A further advantage of keeping the doubletree in contact with the stirrup is that in its position of rest the doubletree is always held at right angles to the tongue, whereby the horses are better kept in line with each other and more liable to start together.

The perfect operation of my device permits of pulling larger loads with less danger of injury to the horse than with the employment of the rigid draft device, and the application of the draft to the outer ends of the axle saves the wagon from much wear and tear.

What I claim as my invention is—

1. In a draft apparatus, a doubletree pivotally secured to the forward end of a sliding tree-iron which is normally retracted under the action of the spring or springs, and the stirrup supporting the forward end of the tree-iron and secured to the hounds upon opposite sides of the pivot of the tree-iron and forming a fulcrum for the tree-iron on either side of the pivot-pin, substantially as described.

2. In a draft apparatus, the combination of the doubletree, the sliding tree iron to which said doubletree is pivotally secured, the stirrup supporting said tree-iron upon the under side of the hounds, the draft-chains secured with their rear ends to the front axle and connected at their front ends to the cross-head, and the coil spring or springs interposed between such cross-head and the rear end of the tree-iron, substantially as described.

3. In a draft apparatus, the combination, with the forward truck of a wagon, of the sliding U-shaped tree-iron F, to which the doubletree is secured, the stirrup G, supporting the forward end of said tree-iron upon the under side of the hounds, the cross-head J, slidingly engaging between the forked ends of the tree-iron, the draft-chains H, connecting the cross-head with the forward axle, the coil spring or springs K, interposed between the cross-head and the rear end of the tree-iron, the guide-rod L, and the bearing M, supporting such guide rod, the parts being constructed and arranged to operate substantially as described.

In testimony whereof I affix my signature, in presence of two witnesses, this 7th day of April, 1888.

CASPAR DREHER.

Witnesses:
P. M. HULBERT,
JOHN SCHUMAN.